May 17, 1927.

J. L. PRICE 1,628,804

MANUFACTURE OF BRAKE DRUMS

Filed July 27, 1925

INVENTOR
JACOB L. PRICE
BY
ATTORNEY

Patented May 17, 1927.

1,628,804

UNITED STATES PATENT OFFICE.

JACOB L. PRICE, OF CHICAGO, ILLINOIS, ASSIGNOR TO BENDIX BRAKE COMPANY, OF CHICAGO, ILLINOIS, A CORPORATION OF ILLINOIS.

MANUFACTURE OF BRAKE DRUMS.

Application filed July 27, 1925. Serial No. 46,505.

This invention relates to brake drums, and has for an object the provision in an inexpensive manner of heat-radiating fins. In one manner of making the novel drums, a helix of channel-shaped or other angular material is cut into sections, each section being welded or otherwise secured on the braking flange of a drum body in such a manner that the side walls or flanges of the helical section serve as heat-radiating fins. It will be seen that the drum body may, if desired, be pressed of sheet metal, instead of formed by casting as with prior drums having heat-radiating fins.

Figure 1:
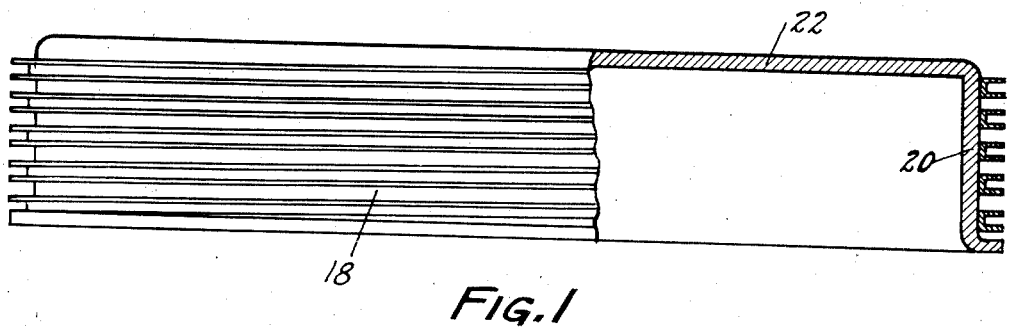
Figure 2:
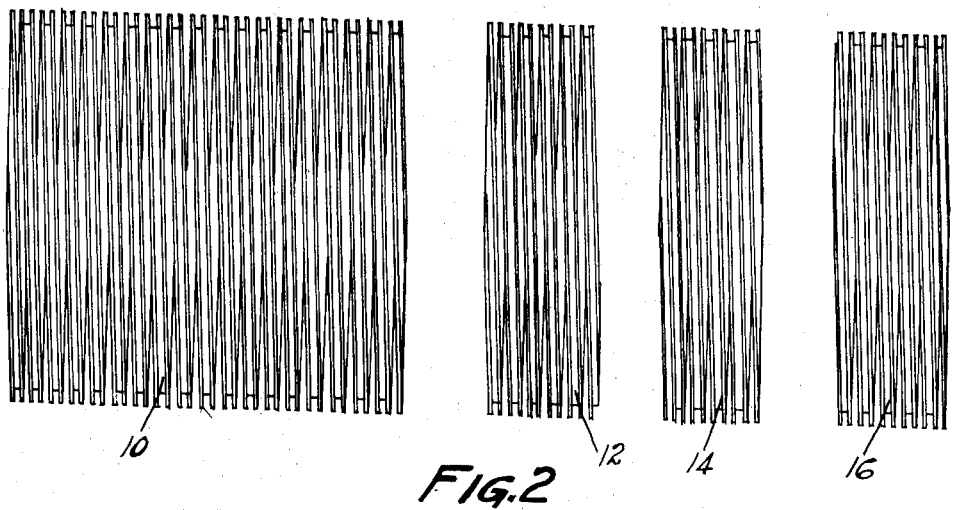

The various objects and advantages will be apparent from the following description of the method of manufacture, as illustrated by the accompanying drawings, in which:

Fig. 1 is a top plan view of a drum, broken away at one side in radial section; and Fig. 2 is a side elevation of the above-described helix and three sections cut therefrom.

The material forming the fins may be channel-shaped in cross-section, and wound in a helix 10, generally like a coil spring, from which sections 12, 14, 16, etc., are separated by cuts substantially at right angles to the axis of the helix.

Each section of the helix, as the section 18 (Fig. 1) is then spot or line welded, or otherwise secured, on the braking flange 20 of a drum body 22, which may be pressed in any usual way from sheet metal of uniform gage. The opposite parallel side walls of the channel then constitute the heat-radiating fins of the drum.

While one particular drum, and one particular method, have been described in detail, it is not my intention to limit the scope of the invention by this description, or otherwise than by the terms of the appended claims.

I claim:

1. That method of making a brake drum which comprises the steps of (a) forming a substantially cylindrical braking flange, (b) winding a helix of material angular in cross-section and having outwardly-extending flange material and inner bore of substantially the same diameter as the flange, (c) cutting a section from the helix, and (d) mounting said section on the braking flange with its flange material serving as heat-radiating fins for the drums.

2. That method of making a brake drum which comprises the steps of (a) forming a substantially cylindrical braking flange, (b) winding a helix of material channel-shaped in cross-section and having outwardly-extending parallel side flanges and inner bore of substantially the same diameter as the flange, (c) cutting a section from the helix, and (d) mounting said section on the braking flange with its side flanges serving as heat-radiating fins for the drum.

3. That method of making a brake drum which comprises the steps of (a) pressing from sheet metal a drum body having a substantially cylindrical braking flange, (b) winding a helix of material angular in cross-section and having outwardly-extending flange material and inner bore of substantially the same diameter as the flange, (c) cutting a section from the helix, and (d) mounting said section on the braking flange with its flange material serving as heat-radiating fins for the drum.

In testimony whereof I have hereunto signed my name.

JACOB L. PRICE.